United States Patent
Lee

(12)
(10) Patent No.: US 6,357,031 B1
(45) Date of Patent: Mar. 12, 2002

(54) SERIAL DATA TRANSMISSION APPARATUS AND METHOD WITH A DATA CHECKING FEATURE

(75) Inventor: Dae-Hun Lee, Daegu (KR)

(73) Assignee: Hyundai Electronics Industries Co., Ltd., Kyoungki-Do (KR)

( * ) Notice: Subject to any disclaimer, the term of this patent is extended or adjusted under 35 U.S.C. 154(b) by 0 days.

(21) Appl. No.: 09/021,939

(22) Filed: Feb. 11, 1998

(30) Foreign Application Priority Data

Feb. 14, 1997 (KR) .............................................. 97/4407

(51) Int. Cl.$^7$ ............................................. H03M 13/00
(52) U.S. Cl. ...................................... 714/758; 714/807
(58) Field of Search ................................ 714/752, 758, 714/807, 774; 375/259, 260; 341/51

(56) References Cited

U.S. PATENT DOCUMENTS

| | | | | |
|---|---|---|---|---|
| 5,097,507 A | * | 3/1992 | Zinser et al. ................ | 704/226 |
| 5,349,589 A | * | 9/1994 | Chnnakeshu et al. ....... | 714/786 |
| 5,434,847 A | * | 7/1995 | Kou ............................ | 370/17 |
| 5,519,603 A | * | 5/1996 | Allbery et al. ............... | 364/133 |
| 5,694,428 A | * | 12/1997 | Campana, Jr. ............... | 375/260 |
| 5,859,859 A | * | 1/1999 | Kim ........................... | 714/801 |
| 5,875,202 A | * | 2/1999 | Venters et al. .............. | 714/807 |
| 5,917,837 A | * | 6/1999 | Stein ........................... | 714/758 |
| 5,923,679 A | * | 7/1999 | Itoh et al. .................... | 714/758 |
| 6,011,817 A | * | 1/2000 | Bergmans et al. .......... | 375/340 |
| 6,163,873 A | * | 12/2000 | Murano ....................... | 714/782 |
| 6,233,708 B1 | | 5/2001 | Hindelang et al. .......... | 714/747 |

FOREIGN PATENT DOCUMENTS

WO WO-38764 A1 * 9/1998 .............. H04I/1/20

OTHER PUBLICATIONS

Souissi et al., A diversity combining DS/CDMA system with convolutional encoding and Viterbi decoding, IEEE, p. 304–312.*
Rice, Comparative analysis of two realizations for hybird –ARQ error control, IEEE, p. 115–119, 1994.*
"Universal Serial Bus" Specification, Version 1.0, Jan. 19, 1996, pp. 2, 147–151.

* cited by examiner

Primary Examiner—Albert Decady
Assistant Examiner—Shelly A Chase
(74) Attorney, Agent, or Firm—Morgan, Lewis & Bockius LLP

(57) ABSTRACT

A disclosed serial data transmission apparatus includes a transceiver for encoding source data D1 to be transmitted, performing a first cyclic redundancy checking (CRC) operation on the encoded data D1', combining a detection data d1 generated by the first cyclic redundancy checking (CRC) operation and the encoded data D1' generated by the encoding, and outputting a combined data (D1'+d1). The serial data transmission apparatus also includes a receiver for separating the combined data (D1'+d1) received from the transceiver into data D1' and d1, concurrently performing a decoding operation of the separated data D1' and a second cyclic redundancy checking operation of the separated data D1', comparing the separated data d1 with a detection data d1' generated by the second cyclic redundancy checking operation, judging whether the decoded data D1 is correct, and outputting the decoded data D1 as a received data. A corresponding method for serially transmitting data is also disclosed.

21 Claims, 3 Drawing Sheets

SERIAL DATA TRANSMISSION APPARATUS AND METHOD WITH A DATA CHECKING FEATURE

This application claims the benefit of Korean Patent Application No. 4407/1997, filed in Korea on Feb. 14, 1997, which is hereby incorporated by reference.

BACKGROUND OF THE INVENTION

1. Field of the Invention

The present invention relates to a serial data transmission apparatus, and more particularly, to an improved serial data transmission apparatus which is capable of enhancing operational speed and is well adapted for serial data transmission using a cyclic redundancy checking (CRC) method. Although the present invention is suitable for a wide scope of applications, it is particularly suitable for serially transmitting a large amount of data. The present invention also relates to a corresponding method for serially transmitting data.

2. Discussion of Related Art

FIG. 1 illustrates a conventional serial data transmission apparatus. As shown therein, the conventional serial data transmission apparatus includes a transceiver 10 and a receiver 20.

The transceiver 10 includes a data storing unit 11 for storing source data to be transmitted and a data checking unit 12 for checking the data from the data storing unit 11 based on a cyclic redundancy checking (CRC) method. The transceiver 10 also includes a data combining unit 13 for combining the outputs from the data storing unit 11 and the data checking unit 12 to generate new data. The transceiver 10 further includes a data encoding unit 14 for encoding the data output from the data combining unit 13 using a non-return-zero-inverted (NRZI) method and serially transmitting the encoded data via a channel.

The receiver 20 includes a data decoding unit 21 for receiving and decoding the NRZI type data transmitted from the transceiver 10 and a data separation unit 22 for separating the data from the data decoding unit 21 to restore it to the form before the data combination by the transceiver 10. Also, the receiver 20 includes a data storing unit 23 for temporarily storing the source data separated by the data separation unit 22, a data checking unit 24 for checking the output from the data storing unit 23 based on the CRC method, and a data comparison unit 25 for comparing the data in order to judge whether the output from the data checking unit 24 and the detection data separated by the data separation unit 22 are identical.

The operation of the conventional serial data transmission apparatus will now be explained with reference to the accompanying drawings.

First, the data storing unit 11 of the transceiver 10 outputs source data D1 to the data checking unit 12. Then, the data checking unit 12 checks the data D1 based on the CRC method and outputs the detection data d1.

Here, the data D1 through Dn are outputted from the data storing unit 11 in a packet-format. In addition, the cyclic redundancy checking (CRC) method employed in the data checking unit 12 is a method of checking whether the data is transmitted without an error. This is accomplished by dividing a k-bit binary data M by an (n+1)-bit data P to produce an n-bit residual F and attaching the n-bit residual F to the front of the k-bit binary data M when transmitting the k-bit binary data M. Then, the combined (n+k)-bit data is output to the next circuit block which checks whether a residual is produced when the (n+k)-bit combined data is divided by the (n+1)-bit data P. If no residual is produced by the division, the transmission of the k-bit data M is judged to have been performed without an error.

In addition, the data combining unit 13 combines the data D1 from the data storing unit 11 and the detection data d1 from the data checking unit 12, and generates a new data (D1+d1). The data (D1+d1) is not to be confused as a mathematical sum of the data D1 and d1. Instead, the data (D1+d1) is generated by combining the bits of the data D1 and d1, i.e., attaching the data d1 to the end of the data D1 as shown in FIG. 2. The data combining unit 13, as shown in FIG. 2, changes the data D1 and d1 having different lengths A and B, respectively, into a new (A+B)-bit data (D1+d1).

The data encoding unit 14 encodes the data (D1+d1) by the non-return-to-zero-inverted (NRZI) method. The encoded data (D1+d1)' is transmitted to the receiver 20.

As shown in FIG. 3, the non-return-to-zero-inverted (NRZI) method is a data encoding method for changing the magnetized state of the encoded data only at falling edges, i.e., when the source data changes the state from 1 to 0, thus generating a different type of data. The method may also be set to change the magnetized state of the encoded data only at rising edges.

In addition, the data decoding unit 21 of the receiver 20 decodes the transmitted data (D1+d1)' to restore the original form of the data (D1+d1) and outputs the data to the data separation unit 22. The data separation unit 22 separates the data (D1+d1) into the source data D1 and the detection data d1, and outputs the separated data D1 and d1.

The source data D1 separated by the data separation unit 22 is transmitted to the data checking unit 24 through the data storing unit 23. The data checking unit 24 checks the source data D1 based on the CRC method and outputs a different detection data d1'.

The data comparison unit 25 decides whether the detection data d1' output by the data checking unit 25 and the restored detection data d1 separated by the data separation unit 22 are identical.

If the detection data d1 and d1' are judged to be identical, namely if it is judged that the source data D1 transmitted from the transceiver 10 to the receiver 20 is correct, the data comparison unit 25 outputs a first signal. In response to the first bit signal, the transceiver 10 transmits the next data D2 to the receiver 20, and the source data D1 is outputted from the data storing unit 23. Here, the first bit signal has a value of 0 or 1.

In contrast, if the detection data d1 and d1' are judged not to be identical, the data comparison unit 25 outputs a second bit signal. In response to the second bit signal, the transceiver 10 does not transmit the next data D2 to the receiver 2, and the previously transmitted source data D1 is transmitted again.

In the conventional serial data transmission apparatus, only after the decoding, data separation, cyclic redundancy checking, and comparison processes are sequentially performed to determine that the data transmitted from the transceiver to the receiver is correct, the transceiver can transmit the next data to the receiver. Thus, the conventional serial data transmission apparatus has an inherent problem of lengthy transmission delay.

SUMMARY OF THE INVENTION

Accordingly, the present invention is directed to a serial data transmission apparatus that substantially obviates one or more of the problems due to limitations and disadvantages of the related art.

Another object of the present invention is to provide an improved serial data transmission apparatus which is capable of rapidly transmitting a large amount of data at a high speed by configuring a transceiver to have a function of performing an encoding operation before a cyclic redundancy checking operation is performed and by configuring a receiver to have a function of concurrently performing a decoding operation and a cyclic redundancy checking operation.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, there is provided a serial data transmission apparatus which includes a transceiver for encoding source data D1 to be transmitted, performing a cyclic redundancy checking (CRC) operation on the encoded data D1', combining a detection data d1 generated by a cyclic redundancy checking (CRC) operation and the encoded data D1' generated by the encoding, and outputting a combined data (D1'+d1); and a receiver for separating the combined data (D1'+d1) received from the transceiver into the data D1' and d1 which are in formats before the data D1' and d1 were combined by the transceiver, concurrently performing a decoding operation of the separated data D1' and a cyclic redundancy checking operation of the separated data D1', comparing the separated data d1 with a detection data d1' generated by the cyclic redundancy checking operation, judging whether the decoded data D1 is correct, and outputting the decoded data D1 as a received data.

In another aspect of the present invention, there is provided a serial data transmission apparatus which includes a transceiver for transmitting a source data, said transceiver having storing means for storing said source data, encoding means for encoding said source data, first checking means for checking the encoded source data to generate a first detection data, and combining means for combining said first detection data generated by said means for checking and said encoded source data to output a combined data; and a receiver for receiving said combined data.

In a further aspect of the present invention, there is provided a method, in a serial data transmission system having a transceiver with a storage means for storing a source data and a receiver, for serially transmitting said source data from said transceiver to said receiver comprising steps of encoding said source data, checking said encoded source data to generate a first detection data, combining said first detection data and said encoded source data to generate a combined data, and receiving said combined data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
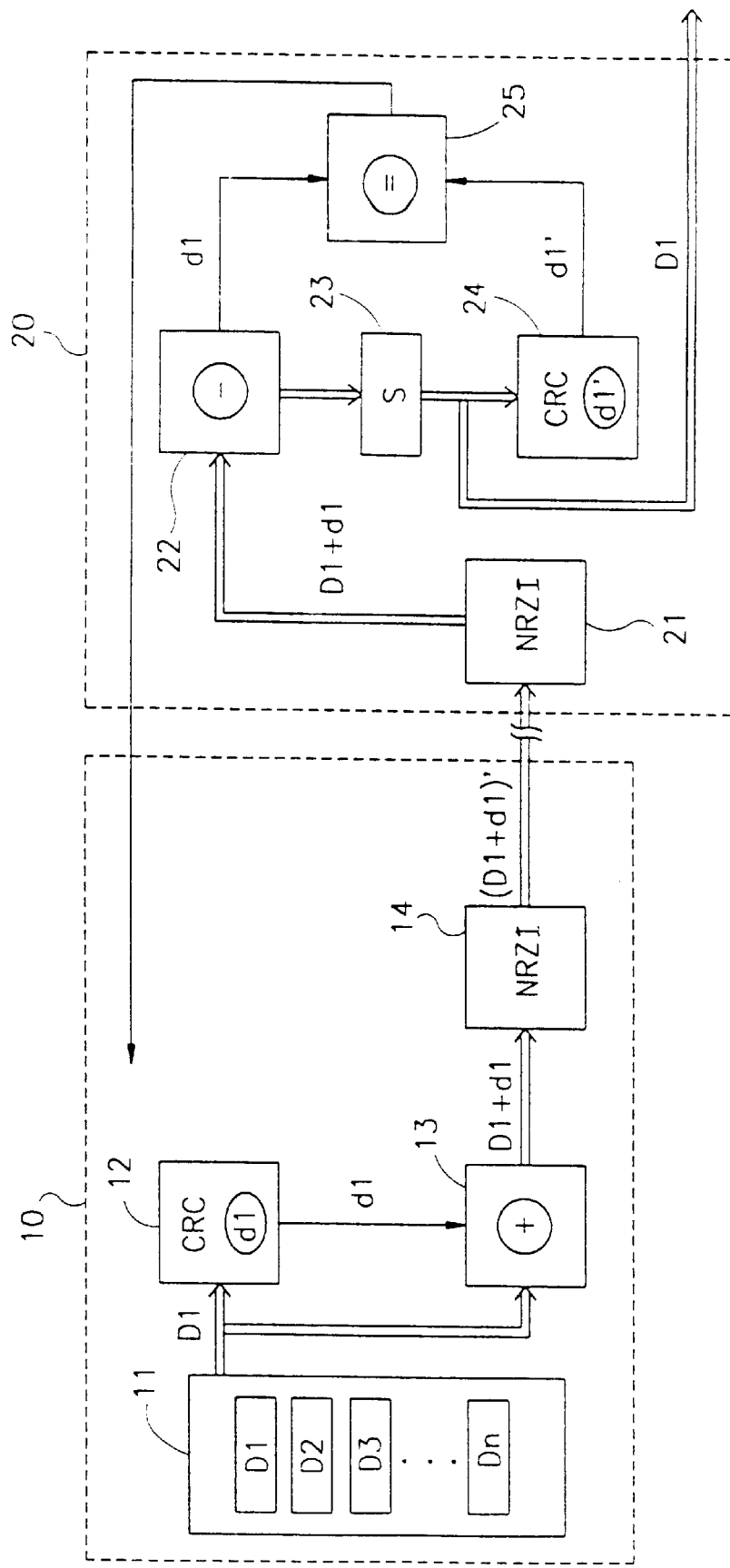
FIG. 1 is a block diagram illustrating a conventional serial data transmission apparatus.
Figure 2:
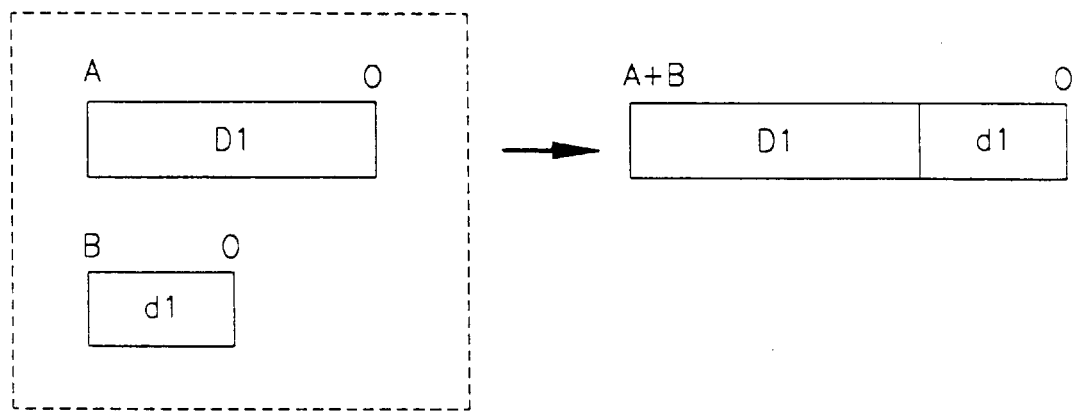
FIG. 2 is a diagram illustrating the operation of a data summation unit in the apparatus of FIG. 1.
Figure 3:
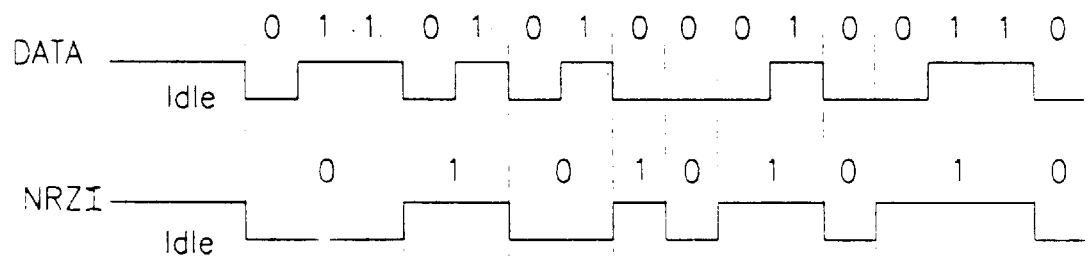
FIG. 3 is a diagram illustrating data which is encoded by using a non-return-to-zero-inverted method in the apparatus of FIG. 1.
Figure 4:
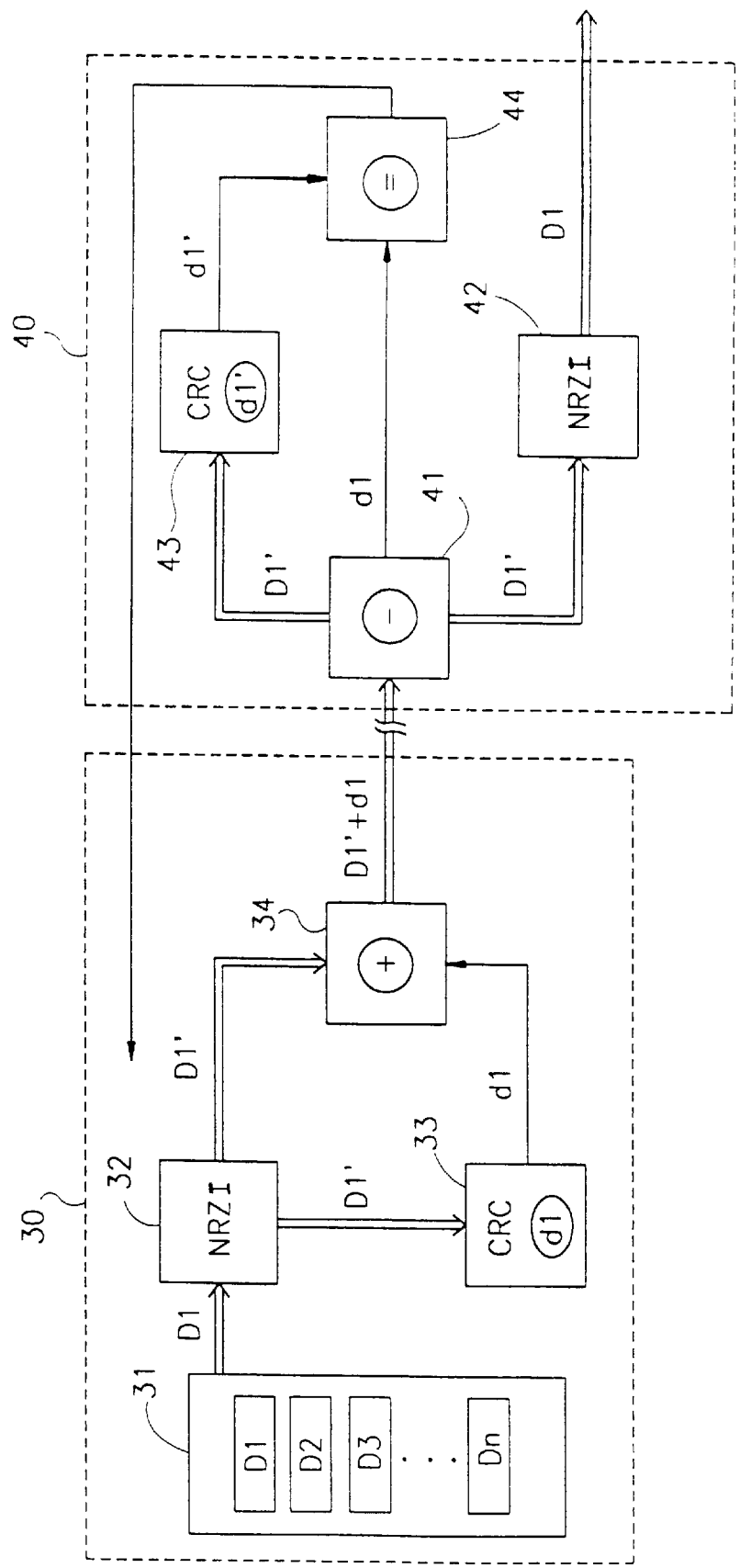
FIG. 4 is a block diagram illustrating a serial data transmission apparatus according to the present invention.

As shown in FIG. 4, a serial data transmission apparatus according to the present invention includes a transceiver 30 for transmitting data and a receiver 40 for receiving and processing the data.

The transceiver 30 is configured to perform an encoding operation before a cyclic redundancy checking operation is performed with respect to source data. The transceiver 30 is also configured to combine a detection data d1 generated from the cyclic redundancy checking operation and a data D1' which is generated by performing the encoding operation on the source data D1. The combined data is defined as (D1'+d1) which is formed by attaching the data d1 to the end of the data D1'.

The receiver 40 is configured to separate the data (D1'+d1) received from the transceiver 30 into data having the same format as before the data was combined by the transceiver 30. The receiver 40 is configured to concurrently perform a decoding operation on the separated data D1' to restore it into its original form D1 and a cyclic redundancy checking operation. The receiver 40 is configured to compare the separated data d1 with the detection data d1' generated from the cyclic redundancy checking operation and to judge whether the received data is correct based on the comparison.

The operation of the serial data transmission apparatus according to the present invention will now be explained with reference to the accompanying drawing.

First, the data storing unit 31 of the transceiver 30 outputs the source data D1 to the data encoding unit 32. The data encoding unit 32 encodes the data D1 by a non-return-to-zero-inverted (NRZI) method and outputs the encoded data D1' to the data checking unit 33 and a data combining unit 34, respectively. The data checking unit 33 checks the data D1' based on the cyclic redundancy checking (CRC) method and outputs the detection data d1.

The data combining unit 34 combines the detection data d1 from the data checking unit 33 and the data D1' from the data encoding unit 32 and generates the data (D1'+d1). The data (D1'+d1) is not to be confused as a mathematical sum of the data D1' and d1. Instead, the data (D1'+d1) is generated by combining the bits of the data D1' and d1, i.e., attaching the data d1 to the end of the data D1'. Then, the data combining unit 34 transmits the data (D1'+d1) to the receiver 40 via a channel.

The data separation unit 41 of the receiver 40 receives the data (D1'+d1) from the data combining unit 34 of the transceiver and separates it into the data D1' and d1, the formats before the data are combined by the data combining unit 34 of the transceiver 30.

The decoding unit 42 decodes the data D1' separated by the data separation unit 41 and outputs the restored source data D1. Concurrently, the data checking unit 43 checks the data D1' based on the cyclic redundancy checking (CRC) method and outputs the detection data d1'.

The data comparison unit 44 compares the detection data d1' from the data detection unit 43 with the detection data d1 from the data separation unit 41. If d1' is identical to d1, the data D1 decoded by the decoding unit 42 is judged to be correct, and the data comparison unit 44 outputs an acknowledge signal (ACK) to the transceiver. In response to the acknowledge signal, the transceiver 30 transmits the next data to the receiver 40.

If d1' is not identical to d1, the data D1 is judged to be incorrect, and the data comparison unit 44 outputs an error signal (NAK) to the transceiver. In response to the NAK signal, transceiver 30 transmits the data D1 again instead of transmitting the next data.

As described above, the serial data transmission apparatus according to the present invention includes a transceiver capable of encoding data before a cyclic redundancy checking operation is performed, and a receiver capable of concurrently performing the decoding operation and the cyclic redundancy checking operation after separating the data received from the transceiver. Since the serial data transmission apparatus according to the present invention is capable of performing some operations concurrently, the operational speed of the serial data transmission apparatus is significantly enhanced. Also, because of the enhanced operational speed, the serial data transmission apparatus according to the present invention is much better suited for serial transmission of a large amount of data than the conventional art.

It will be apparent to those skilled in the art that various modification and variations can be made in the serial data transmission apparatus of the present invention without departing from the spirit or scope of the inventions. Thus, it is intended that the present invention cover the modifications and variations of this invention provided they come within the scope of the appended claims and their equivalents.

What is claimed is:

1. A serial data transmission apparatus, comprising:
   a transceiver for encoding source data D1 to be transmitted, performing a first cyclic redundancy checking (CRC) operation on the encoded data D1', combining a detection data d1 generated by the first cyclic redundancy checking (CRC) operation and the encoded data D1' generated by the encoding, and outputting a combined data (D1'+d1); and
   a receiver for separating the combined data (D1'+d1) received from the transceiver into data D1' and d1, concurrently performing a decoding operation of the separated data D1' and a second cyclic redundancy checking operation of the separated data D1', comparing the separated data d1 with a detection data d1' generated by the second cyclic redundancy checking operation, judging whether the decoded data D1 is correct, and outputting the decoded data D1 as a received data.

2. The serial data transmission apparatus according to claim 1, wherein said transceiver includes:
   a data storing unit for storing the source data D1 to be transmitted;
   a data encoding unit for encoding the source data D1 from the data storing unit by a non-return-to-zero-inverted method to generate the encoded data D1';
   a data checking unit for checking the encoded data D1' from the data encoding unit by a cyclic redundancy checking (CRC) method to generate the detection data d1; and
   a data combining unit for combining the detection data d1 from the data checking unit and the encoded data D1' from the data encoding unit for generating the combined data (D1'+d1) and outputting the combined data (D1'+d1) to the receiver.

3. The serial data transmission apparatus according to claim 1, wherein said receiver includes:
   a data separation unit for separating the combined data (D1'+d1) from the transceiver into data D1' and d1;
   a data decoding unit for decoding the data D1' to generate the data D1;
   a data checking unit for checking the data D1' to generate the detection data d1'; and
   a data comparison unit for comparing the detection data d1' from the data checking unit and the data d1 separated by the data separation unit.

4. A serial data transmission apparatus, comprising:
   a transceiver for transmitting a source data, said transceiver comprising
      a data storage for storing said source data,
      an encoder for encoding said source data to generate an encoded source data,
      a first checking unit for checking the encoded source data to generate a first detection data, and
      a data combiner for combining said first detection data generated by said first checking unit and said encoded source data to output a combined data; and
   a receiver for receiving said combined data.

5. The serial transmission apparatus according to claim 4, wherein said encoder encodes said source data by a non-return-to-zero-inverted method to generate said encoded source data.

6. The serial transmission apparatus according to claim 4, wherein said first checking unit performs a cyclic redundancy checking (CRC) operation on said encoded source data to generate said first detection data.

7. The serial transmission apparatus according to claim 4, wherein said data combiner attaches said first detection data to the end of said encoded source data.

8. The serial transmission apparatus according to claim 4, wherein said receiver comprises:
   a data separator for separating said combined data from said transceiver to recover said encoded source data and said first detection data;
   a decoder for decoding said recovered encoded source data to generate a recovered source data;
   a second checking unit for checking said recovered encoded source data and generating a second detection data; and
   a comparator for comparing said recovered first detection data and said second detection data.

9. The serial data transmission apparatus according to claim 8, wherein said decoder and said second checking unit respectively decode and check said recovered encoded source data at least substantially concurrently.

10. The serial data transmission apparatus according to claim 8, wherein said decoder decodes said recovered encoded source data by a non-return-to-zero-inverted method to generate said recovered source data.

11. The serial data transmission apparatus according to claim 8, wherein said second checking unit includes means for performing a cyclic redundancy checking (CRC) operation on said encoded source data to generate said second detection data.

12. The serial data transmission apparatus according to claim 8, wherein said comparator sends an acknowledge signal to said transceiver to transmit a next source data if said recovered first detection data and said second detection data are identical, and sends an error signal to said transceiver to transmit said source data again if said recovered first detection data and said second detection data are not identical.

13. A method for serially transmitting a source data from a transceiver to a receiver comprising steps of:

encoding said source data to generate an encoded source data;

checking said encoded source data to generate a first detection data;

combining said first detection data and said encoded source data to generate a combined data; and transmitting and receiving said combined data.

14. The method according to claim 13, wherein said step of encoding includes a step of encoding said source data by a non-return-to-zero-inverted method to generate said encoded source data.

15. The method according to claim 13, wherein said step of checking includes a step of performing a cyclic redundancy checking (CRC) operation on said encoded source data to generate said first detection data.

16. The method according to claim 13, wherein said step of combining includes a step of attaching said first detection data to the end of said encoded source data to generate said combined data.

17. The method according to claim 13, wherein said step of receiving includes steps of:

separating said combined data to recover said encoded source data and said first detection data;

decoding said recovered encoded source data to generate a recovered source data;

checking said recovered encoded source data to generate a second detection data; and comparing said recovered first detection data and said second detection data.

18. The method according to claim 17, wherein said step of decoding and said step of checking said recovered encoded source data are performed at least substantially concurrently.

19. The method according to claim 17, wherein said step of decoding includes a step of decoding said recovered encoded source data by a non-return-to-zero-inverted method to generate said recovered source data.

20. The method according to claim 17, wherein said step of checking said recovered encoded source data includes a step of performing a cyclic redundancy checking (CRC) operation on said recovered encoded source data to generate said second detection data.

21. A method according to claim 17, wherein said step of comparing includes steps of:

generating an acknowledge signal to cause said transceiver to transmit a next source data if said recovered first detection data and said second detection data are identical, and generating an error signal to cause said transceiver to transmit said source data again if said recovered first detection data and said second detection data are not identical.

\* \* \* \* \*